United States Patent [19]
O'Brien

[11] Patent Number: 4,541,559
[45] Date of Patent: Sep. 17, 1985

[54] METHOD OF MAKING ELECTRICAL CONNECTIONS BETWEEN OPPOSING METAL FOILS HAVING A FLEXIBLE, INSULATING LAYER SANDWICHED THEREBETWEEN

[75] Inventor: Philip W. O'Brien, Roseville, Minn.

[73] Assignee: Minnesota Mining and Manufacturing Company, St. Paul, Minn.

[21] Appl. No.: 552,306

[22] Filed: Nov. 16, 1983

[51] Int. Cl.[4] .......... B23K 20/12
[52] U.S. Cl. .......... 228/117; 228/115; 228/179; 228/3.1; 228/44.3; 228/44.7; 29/849; 156/250; 156/261; 156/313; 428/139
[58] Field of Search .......... 29/570, 25.42, 581, 29/825, 849, 868, 738, 761; 156/250, 261, 324, 313, 309.9; 428/139; 427/81, 357; 228/115, 117, 179, 3.1, 44.1 R, 44.1 A, 903; 264/163, 282, 299

[56] References Cited

U.S. PATENT DOCUMENTS

| | | | |
|---|---|---|---|
| 2,894,321 | 7/1959 | Dubilier | 228/115 |
| 3,618,843 | 11/1971 | Hayes et al. | 228/115 |
| 3,913,219 | 10/1975 | Lichtblau | 29/625 |
| 4,319,708 | 3/1982 | Lomerson | 228/3.1 X |

*Primary Examiner*—Joseph L. Schofer
*Assistant Examiner*—Fred M. Teskin
*Attorney, Agent, or Firm*—Donald M. Sell; James A. Smith; William B. Barte

[57] ABSTRACT

A method of making electrical connections between metal foils laminated to opposing surfaces of a flexible insulating layer, such as may be configured with spiral patterns in the respective metal foils to form inductive-capacitive circuits useful as detectable markers in RF antipilferage systems, and wherein an electrical connection is provided between the opposing foils by first extruding the laminate to shear the insulating layer and to contact the opposing metal foils in the vicinity of the sheared insulator layer and by subsequently forcing the extrusion back into a substantially planar relationship relative to the remainder of the laminate.

3 Claims, 3 Drawing Figures

METHOD OF MAKING ELECTRICAL CONNECTIONS BETWEEN OPPOSING METAL FOILS HAVING A FLEXIBLE, INSULATING LAYER SANDWICHED THEREBETWEEN

FIELD OF THE INVENTION

This invention relates to laminates comprising metal foils and insulative materials sandwiched therebetween, and to methods for providing electrical connections between the opposing foils.

DESCRIPTION OF THE PRIOR ART

Laminates comprising metal foils having a thin insulator sandwiched therebetween are, of course, quite common, and are typically utilized in electronic printed circuits. In such applications, it is quite commonplace to desire electrical connections between electrical circuits on opposing sides of the insulator, and eyelets or conductive paints and solder joints extending through holes in the insulator are typically utilized to provide such connections. Another, somewhat more esoteric use for such laminates is in the area of electronic article surveillance systems. In such systems, markers responsive to radio frequency fields created in an interrogation zone, such as at exits to retail stores, libraries and the like, typically comprise a flexible insulative, dielectric sheet having a metal foil on each side, wherein the foil on at least one side is in the form of a planar inductive spiral and wherein the opposing foils and sandwiched dielectric sheet form a capacitor. The inductive spiral and capacitor combine to form a tuned resonant inductive-capacitive (LC) circuit which can be detected when excited into resonance by the RF field. As such systems have been refined to improve reliability and to offer additional features such as deactivatibility, the LC circuits have similarly become more complex. For example, U.S. Pat. No. 3,913,219 (Lichtblau) depicts an LC circuit which includes two inductors and two capacitors together with a fusible link. In that circuit, a conductive interconnection between confronting conductive surfaces is provided, such as by ultrasonically or cold welding together the respective surfaces. In the latter case, a cold welding tool having a chisel-like tip is said to be driven through the laminate to cold weld the confronting surfaces. While such a technique may be practical in some instances, experience has shown that the electrical contact thus formed is often unreliable, and the result of the physical operation is to deform the laminate, leaving an unsightly bulge which inhibits concealment of the marker-laminate.

SUMMARY OF THE INVENTION

Unlike the technique described above, the method of the present invention results in the formation of an electrical contact between opposing surfaces of a laminate including metal foils affixed to opposite surfaces of a flexible insulative sheet in which the contact is both permanent and reliable, and the contact area is substantially coplanar with the remainder of the laminate. According to the present invention, a localized area of the laminate is extruded into a die cavity to an extent sufficient to shear the insulative sheet at the periphery of the cavity while leaving intact the respective metal foils, to cause metal-to-metal contact between the opposing foils at the periphery. The extruded area is then forced back into a substantially planar relationship with the remainder of the laminate to cause the extruded area to form a plug therein and to further establish a permanent electrical contact between the opposing foils at the periphery. In a preferred embodiment, the initial extrusion is formed by pressing a conically shaped punch and a circular shaped die to opposing foil surfaces, thus extending the laminate into the die. The resultant extrusion is thus conically shaped on the inside, and cylindrically shaped on the outside. The extrusion is then desirably compressed into a planar relationship with the remainder of the laminate by applying opposing flat faced punches.

DESCRIPTION OF THE PREFERRED EMBODIMENTS

A preferred embodiment of a tuned resonant circuit which includes an electrical connection according to the present invention is set forth in Ser. No. 552,305 by W. C. Tait, filed the same day herewith. As there disclosed, such a circuit comprises a laminate of a first metallic spiral, a dielectric sheet, second metallic spiral and a connection through the dielectric sheet which contacts opposing portions of the first and second spirals. The respective spirals may be prepared and bonded to the respective opposite surfaces of the dielectric sheet in any of a number of conventional manners.

A preferred construction of a circuit such as there disclosed may be formed of a polyethylene film approximately 0.002 inches (0.05 mm) thick having bonded to opposing surfaces thereof the respective spiral patterns formed of aluminum foil, 0.002 inches (0.05 mm) thick. Such spiral patterns may be formed by any of a variety of conventional techniques, such as by die-cutting the patterns into a sheet of aluminum foil and thereafter bonding the spiral patterns to the opposing surfaces of the dielectric sheet. Similarly, non-configured aluminum foil sheets may be previously bonded to a dielectric sheet and the spiral patterns thereafter provided via conventional etching techniques.

Polyethylene films are particularly desirable as the flexible insulative sheet used in the method of the present invention, inasmuch as metallic foils such as aluminum may be readily bonded thereto. It is similarly within the scope of the present invention that numerous polymeric materials may similarly be utilized. The thickness and composition of the material selected would thus depend upon the specific capacitance or other electrical properties desired in the resultant article.

Figure 1:
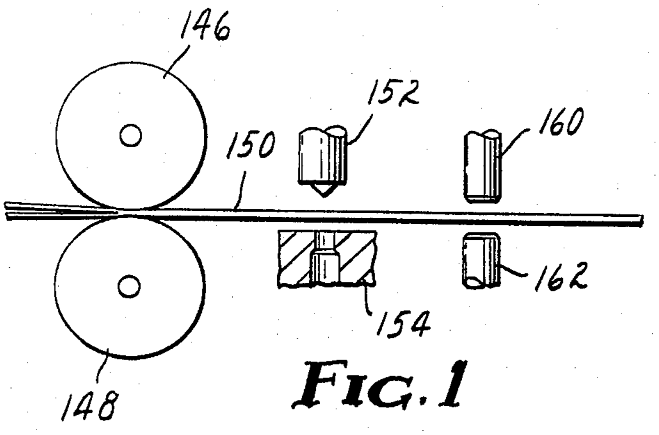
FIG. 1 is a cross-sectional view of a preferred process of the present invention.
Figure 2:
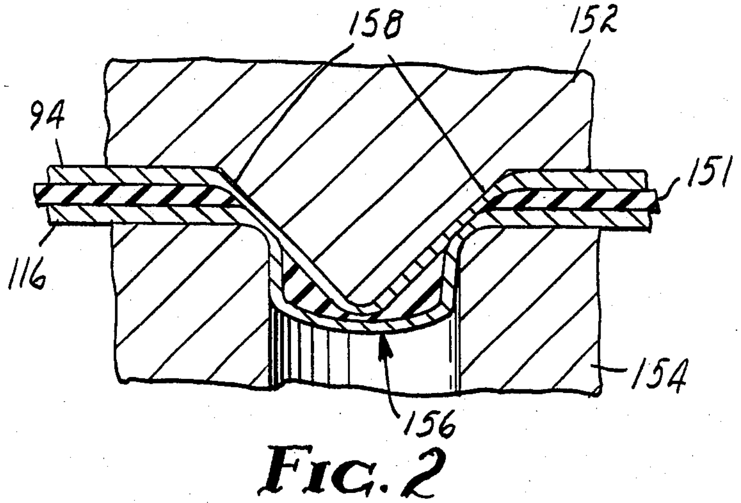
FIGS. 2 and 3 are cross-sections of the electrical contact resulting of two stages shown in FIG. 1.
Figure 3:
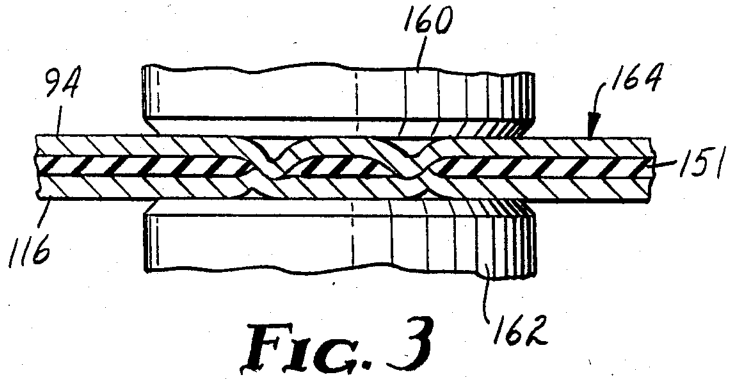

A preferred method of providing a connection between the opposing metal foil layers according to the present invention is shown in FIG. 1. According to this method, after a laminate 150 is formed, such as via pressure rollers 146 and 148, a conically shaped punch 152 and an aligned die 154 having a round opening, are applied to opposing surfaces of a selected portion of the laminate. Where the metallic foils are particularly configured, for example in a spiral pattern as in the patent application acknowledged above, the selected portions may be desirably provided with enlarged conductive areas extending beyond the periphery of the punch and die members. As shown in detail in the cross-sectional view of FIG. 2, the punch action causes an extrusion 156 to form in the die cavity, with the laminated dielectric layer 151 being sheared and metal to metal contact being made between the aluminum sheets 94 and 116 at the periphery 158 of the extrusion. The extrusion is then forced back into the laminate via opposing flat faced punches 160 and 162 to form a plug and a permanent electrical contact, as shown in detail in the cross-sectional view of FIG. 3. This punching operation compresses the extrusion, and results in a permanent, lowresistance connection across the shear line at the periphery 158, while leaving the final laminate 164 substantially planar, with no protrusions or bumps. Typically, connections having resistances of only a few tenths of an ohm have been thus reproducibly formed. The final formed laminate 164 may then be coupled to a converter (not shown) within which, for example, individual articles may be partially die-cut and/or assembled on a carrier liner for ready use by the ultimate consumer.

Having thus described the preferred embodiments of methods of making the substantially planar LC networks of the present invention and of the networks per se, it will be understood that changes may be made in the size, shape or configuration of the parts of circuits described herein without departing from the present invention as recited in the claims.

I claim:

1. A method of forming a marker for use in an electronic article surveillance system, wherein said marker comprises a circuit resonant at at least one radio frequency, wherein said method includes the steps of (a) providing a flexible insulating sheet, (b) forming a laminate by affixing to opposing surfaces of said sheet first and second metal foils configured as predetermined patterns, said opposing patterns and the insulating sheet sandwiched therebetween forming at least one capacitive element, and at least one of said first and second patterns forming at least one multi-turn inductive element which in combination with said capacitive element results in an inductive-capactive circuit resonant at at least one radio frequency, and (c) forming an electrical contact between at least one selected point on the opposing patterns, wherein said forming step comprises extruding a localized area of said laminate into a die cavity and in so doing, shearing the insulative sheet at the periphery of the die cavity to cause metal to metal contact between the opposing metal foils at said periphery, and forcing the extruded area back into a substantially planar relationship with the remainder of the laminate to cause the extruded area to form a plug therein and a permanent electrical contact between the opposing foils at the periphery.

2. A method according to claim 1, comprising applying a conically forced punch to one foil and a circular-shaped die to the opposing foil, thus forcing a conically shaped extrusion of said laminate in the circular die cavity and forming electrical contact between said foils around substantially the entire periphery of the extruded area, and applying opposing flat faced punches to said extrusion to compress the extrusion back into said substantially planar relationship.

3. A method of forming a marker for use in an electronic article surveillance system, wherein said marker comprises a circuit resonant at at least one radio frequency, wherein said method includes the steps of (a) providing a flexible insulating sheet, (b) forming a laminate by affixing to opposing surfaces of said sheet first and second metal foils configured as predetermined patterns, said opposing patterns and the insulating sheet sandwiched therebetween forming at least one capacitive element, and at least one of said first and second patterns forming at least one multi-turn inductive element which in combination with said capacitive element results in an inductive-capactive circuit resonant at at least one radio frequency, and (c) forming an electrical contact between at least one selected point on the opposing patterns, wherein said forming step comprises applying a conically shaped punch to one surface of a said foil and an opposing die to an opposing surface of the foil on the opposite side of the dielectric sheet thereby extruding the laminate into the die cavity and shearing of the dielectric sheet at the periphery of the die, such that metal-to-metal contact results between the opposing foils, and applying opposing flat faced punches to the opposing foil surfaces extending over the extrusion to force the extrusion back into a substantially planar configuration with the remainder of the laminate forming a plug therein and a permanent electrical contact between the respective foils at the periphery of the original extrusion.

* * * * *